United States Patent
Ganesan et al.

(10) Patent No.: US 11,010,249 B2
(45) Date of Patent: May 18, 2021

(54) KERNEL RESET TO RECOVER FROM OPERATING SYSTEM ERRORS

(71) Applicant: Dell Products L.P., Round Rock, TX (US)

(72) Inventors: Vaideeswaran Ganesan, Bangalore (IN); Suren Kumar, Vellore (IN); B. Balaji Singh, Bangalore (IN); David Keith Chalfant, Round Rock, TX (US); Swamy Kadaba Chaluvaiah, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 149 days.

(21) Appl. No.: 16/243,054

(22) Filed: Jan. 8, 2019

(65) Prior Publication Data

US 2020/0218612 A1 Jul. 9, 2020

(51) Int. Cl.
*G06F 11/07* (2006.01)
*G06F 11/14* (2006.01)

(52) U.S. Cl.
CPC ...... *G06F 11/1417* (2013.01); *G06F 11/0793* (2013.01); *G06F 11/1438* (2013.01); *G06F 11/1441* (2013.01); *G06F 2201/805* (2013.01)

(58) Field of Classification Search
CPC ............. G06F 11/0793; G06F 11/1438; G06F 11/1441
See application file for complete search history.

(56) References Cited

U.S. PATENT DOCUMENTS

| | | | | |
|---|---|---|---|---|
| 5,195,130 A | * | 3/1993 | Weiss | G06F 8/60 379/93.19 |
| 6,253,320 B1 | * | 6/2001 | Sekiguchi | G06F 9/4406 713/2 |
| 6,434,696 B1 | | 8/2002 | Kang | |
| 6,718,461 B1 | | 4/2004 | Ewertz | |
| 6,883,091 B2 | | 4/2005 | Morrison et al. | |
| 7,240,222 B1 | * | 7/2007 | Falik | G06F 1/3209 713/300 |
| 7,409,537 B2 | | 8/2008 | Tsang | |
| 7,568,195 B2 | | 7/2009 | Markley et al. | |
| 7,584,467 B2 | | 9/2009 | Wickham et al. | |
| 8,412,816 B2 | | 4/2013 | Jreij et al. | |
| 9,405,526 B2 | | 8/2016 | Thapar et al. | |

(Continued)

OTHER PUBLICATIONS

Using Zero-Power CPLDs to Substantially Lower Power Consumption in Portable Applications by Altera Corp, Jul. 2009 https://www.intel.com/content/dam/www/programmable/us/en/pdfs/literature/wp/wp-01042-using-zero-power-cplds-to-lower-power-in-portable.pdf (Year: 2009).*

(Continued)

*Primary Examiner* — Joseph O Schell
(74) *Attorney, Agent, or Firm* — Norton Rose Fulbright US LLP

(57) ABSTRACT

A baseboard management controller (BMC) of an information handling system may generate a signal to cause the information handling system to reload a kernel of an operating system of the information handling system. The BMC may generate a signal for reloading a kernel of an operating system of an information handling system, and the information handling system may reload the operating system kernel.

20 Claims, 5 Drawing Sheets

(56) References Cited

U.S. PATENT DOCUMENTS

| | | | |
|---|---|---|---|
| 2005/0172305 A1* | 8/2005 | Baumberger | G06F 11/0712 |
| | | | 719/327 |
| 2005/0223209 A1 | 10/2005 | Chang | |
| 2010/0058045 A1* | 3/2010 | Borras | G06F 9/44573 |
| | | | 713/2 |
| 2011/0035618 A1* | 2/2011 | Jann | G06F 11/0712 |
| | | | 714/3 |
| 2011/0231639 A1* | 9/2011 | Chien | G06F 1/26 |
| | | | 713/2 |
| 2014/0365823 A1* | 12/2014 | Michihata | G06F 11/1417 |
| | | | 714/16 |
| 2015/0089105 A1* | 3/2015 | Lu | G06F 13/24 |
| | | | 710/269 |
| 2018/0011714 A1* | 1/2018 | Han | G06F 3/0604 |
| 2018/0165101 A1* | 6/2018 | Bulusu | G06F 11/1417 |

OTHER PUBLICATIONS

Wikipedia's Kernel (Computer Science) historical version published Nov. 4, 2018 https://simple.wikipedia.org/w/index.php?title=Kernel_(computer_science)&oldid=6296890 (Year: 2018).*

* cited by examiner

KERNEL RESET TO RECOVER FROM OPERATING SYSTEM ERRORS

FIELD OF THE DISCLOSURE

The instant disclosure relates to the operating system error recovery. More specifically, portions of this disclosure relate to resetting a kernel of an operating system to recover from operating system errors.

BACKGROUND

As the value and use of information increase, individuals and businesses seek additional ways to process and store information. One option available for such a purpose is the information handling system. An information handling system generally processes, compiles, stores, and/or communicates information or data for business, personal, or other purposes thereby allowing users to take advantage of the value of the information. Because technology and information handling requirements vary between different users or applications, information handling systems may also vary regarding what information is handled, how the information is handled, how much information is processed, stored, or communicated, and how quickly and efficiently the information may be processed, stored, or communicated. Variations in information handling system build and capabilities allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Users may reboot information handling systems for a variety of reasons. For example, a user may power down an information handling system to save energy when the system is not in use. As another example, a user may reboot an information handling system in order to install hardware, firmware, and/or software updates. Information handling systems may, from time to time, encounter errors. Such errors may require that the information handling system be rebooted in order to recover from the error and resume operation.

When an information handling system is powered on, the system executes a booting process to initialize hardware and software for use. For example, information handling systems may load and initialize drivers, inventory hardware components, apply hardware, firmware, and software updates, and load and boot an operating system (OS) of the information handling system. Booting and/or rebooting an information handling system may require a substantial amount of time, sometimes reaching or even exceeding 10 minutes, which can negatively impact a user experience. The boot time can be particularly long for information handling systems with large amounts of hardware, such as servers. Often information handling systems include multiple components that must be inventoried, initialized, and allocated resources prior to booting an operating system. Users may find extended booting times or unnecessary system reboots inconvenient.

Shortcomings mentioned here are only representative and are included simply to highlight that a need exists for improved information handling systems. Embodiments described herein address certain shortcomings but not necessarily each and every one described here or known in the art. Furthermore, embodiments described herein may present other benefits than, and be used in other applications than, those of the shortcomings described above.

SUMMARY

An information handling system may recover from an operating system error, such as an operating system hang, by reloading a kernel of the operating system. For example, when an operating system freezes or becomes unresponsive, the information handling system may reload the kernel of the operating system instead of performing a full system reboot. Reloading the kernel of the operating system can save a substantial amount of time over performing a full system reboot, enhancing a user experience.

A baseboard management controller (BMC) of an information handling system may generate a signal to initiate a process of reloading a kernel of an operating system of an information handling system. For example, a BMC may generate a signal for reloading a kernel of the operating system, and the information handling system may then reload the operating system kernel. The BMC may generate the signal based upon detection, by the BMC, of an error of the operating system, such as an operating system hang. For example, the BMC may detect that the operating system has entered an unresponsive state and may generate a signal for reloading a kernel of the operating system.

To generate the signal for reloading the kernel of the operating system, the BMC may pulse power to a power button line of the information handling system. For example, the power button line may be line coupled to a power button of an information handling system to allow a user of the information handling system to indicate that the system should be powered down or rebooted. The BMC may pulse the power line at a predetermined interval and/or for a predetermined time frame in order to distinguish the kernel reset command from an instruction by a user to shut down or reboot the information handling system. The pulse on the power line may be generated by a complex programmable logic device (CPLD) of the BMC.

The signal generated by the BMC may be detected by an Advanced Configuration and Power Interface (ACPI) driver of the information handling system. When the ACPI driver detects the signal generated by the BMC, it may issue a kernel reset command to reload the kernel of the operating system. Resetting the kernel may, for example, include reloading a last good state of the kernel from a non-volatile random access memory (NVRAM) of the information handling system. Thus, the BMC may, in conjunction with the ACPI driver, work around an unresponsive operating system to reload a kernel of the operating system of the information handling system and recover from an operating system error, such as an operating system hang, without requiring a full system reboot.

An information handling system may include a processor and/or a BMC for performing the steps described herein. Furthermore, an information handling system may include a memory, such as an NVRAM, for storing instructions and/or a last good state of a kernel of an operating system of the information handling system. Instructions for performing the steps described herein may be stored on a non-transitory computer readable medium.

The foregoing has outlined rather broadly certain features and technical advantages of embodiments of the present invention in order that the detailed description that follows may be better understood. Additional features and advantages will be described hereinafter that form the subject of the claims of the invention. It should be appreciated by those having ordinary skill in the art that the conception and specific embodiment disclosed may be readily utilized as a basis for modifying or designing other structures for carrying out the same or similar purposes. It should also be realized by those having ordinary skill in the art that such equivalent constructions do not depart from the spirit and scope of the invention as set forth in the appended claims. Additional features will be better understood from the following description when considered in connection with the accompanying figures. It is to be expressly understood, however, that each of the figures is provided for the purpose of illustration and description only and is not intended to limit the present invention.

BRIEF DESCRIPTION OF THE DRAWINGS

For a more complete understanding of the disclosed system and methods, reference is now made to the following descriptions taken in conjunction with the accompanying drawings.

DETAILED DESCRIPTION

For purposes of this disclosure, an information handling system (IHS) may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, a two-in-one laptop/tablet computer, mobile device (e.g., personal digital assistant (PDA), smart phone, tablet computer, or smart watch), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more virtual or physical buses operable to transmit communications between the various hardware and/or software components.

Figure 1:
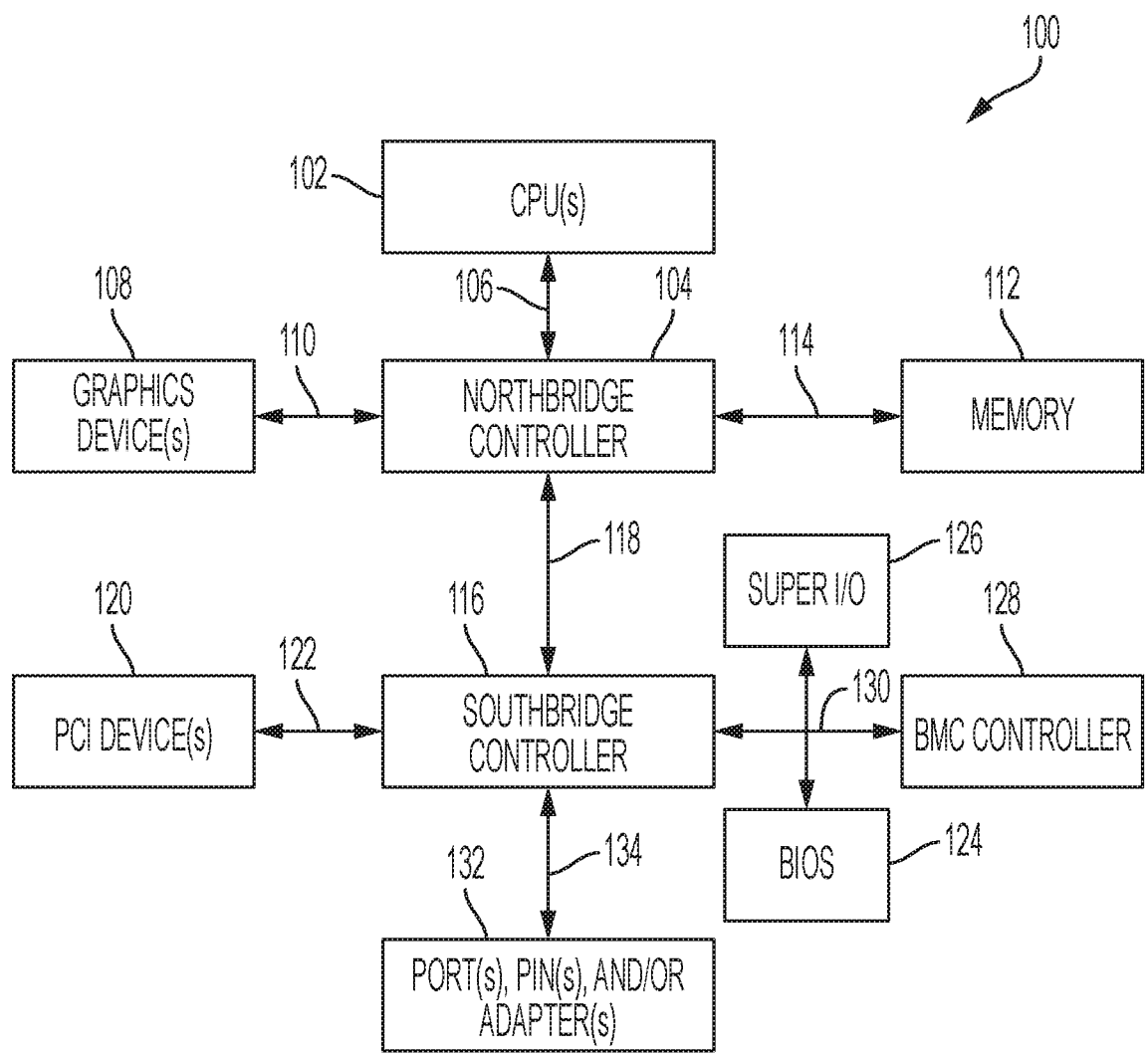
FIG. 1 is a schematic block diagram of an example information handling system according to some embodiments of the disclosure.

An information handling system may include a variety of components to generate, process, display, manipulate, transmit, and receive information. One example of an information handling system 100 is shown in FIG. 1. IHS 100 may include one or more central processing units (CPUs) 102. In some embodiments, IHS 100 may be a single-processor system with a single CPU 102, while in other embodiments IHS 100 may be a multi-processor system including two or more CPUs 102 (e.g., two, four, eight, or any other suitable number). CPU(s) 102 may include any processor capable of executing program instructions. For example, CPU(s) 102 may be processors capable of implementing any of a variety of instruction set architectures (ISAs), such as the x86, POWERPC®, ARM®, SPARC®, or MIPS® ISAs, or any other suitable ISA. In multi-processor systems, each of CPU(s) 102 may commonly, but not necessarily, implement the same ISA.

CPU(s) 102 may be coupled to northbridge controller or chipset 104 via front-side bus 106. The front-side bus 106 may include multiple data links arranged in a set or bus configuration. Northbridge controller 104 may be configured to coordinate I/O traffic between CPU(s) 102 and other components. For example, northbridge controller 104 may be coupled to graphics device(s) 108 (e.g., one or more video cards or adaptors, etc.) via graphics bus 110 (e.g., an Accelerated Graphics Port or AGP bus, a Peripheral Component Interconnect or PCI bus, etc.). Northbridge controller 104 may also be coupled to system memory 112 via memory bus 114. Memory 112 may be configured to store program instructions and/or data accessible by CPU(s) 102. In various embodiments, memory 112 may be implemented using any suitable memory technology, such as static RAM (SRAM), synchronous dynamic RAM (SDRAM), nonvolatile/Flash-type memory, or any other type of memory. In some embodiments memory 112 may include NVRAM. In other embodiments, NVRAM may be separately included in or coupled to CPU 102.

Northbridge controller 104 may be coupled to southbridge controller or chipset 116 via internal bus 118. Generally, southbridge controller 116 may be configured to handle various of IHS 100's I/O operations, and it may provide interfaces such as, for instance, Universal Serial Bus (USB), audio, serial, parallel, Ethernet, etc., via port(s), pin(s), and/or adapter(s) 132 over bus 134. For example, southbridge controller 116 may be configured to allow data to be exchanged between IHS 100 and other devices, such as other IHS s attached to a network. In various embodiments, southbridge controller 116 may support communication via wired or wireless general data networks, such as any suitable type of Ethernet network, for example; via telecommunications/telephony networks such as analog voice networks or digital fiber communications networks; via storage area networks such as Fiber Channel SANs; or via any other suitable type of network and/or protocol.

Southbridge controller 116 may also enable connection to one or more keyboards, keypads, touch screens, scanning devices, voice or optical recognition devices, or any other devices suitable for entering or retrieving data. Multiple I/O devices may be present in IHS 100. In some embodiments, I/O devices may be separate from IHS 100 and may interact with IHS 100 through a wired or wireless connection. As shown, southbridge controller 116 may be further coupled to one or more PCI devices 120 (e.g., modems, network cards, sound cards, video cards, etc.) via PCI bus 122. Southbridge controller 116 may also be coupled to Basic I/O System (BIOS) 124, Super I/O Controller 126, and Baseboard Management Controller (BMC) 128 via Low Pin Count (LPC) bus 130. Super I/O controller 126 may combine interfaces for a variety of lower bandwidth or low data rate devices. Those devices may include, for example, floppy disks, parallel ports, keyboard and mouse, temperature sensor and fan speed monitoring, etc.

BIOS 124 may include non-volatile memory, such as NVRAM, having program instructions stored thereon. The instructions stored on the BIOS may be usable CPU(s) 102 to initialize and test other hardware components and/or to load an Operating System (OS) onto IHS 100, for example during a booting of an information handling system. As such, BIOS 124 may include a firmware interface that allows CPU(s) 102 to load and execute certain firmware. In some cases, such firmware may include program code that is compatible with the Unified Extensible Firmware Interface (UEFI) specification, although other types of firmware may be used.

BMC 128 may include non-volatile memory having program instructions stored thereon that are usable by CPU(s) 102 to enable remote management of IHS 100. For example, BMC 128 may enable a user to discover, configure, and manage BMC 128, setup configuration options, resolve and administer hardware or software problems, etc. Additionally or alternatively, BMC 128 may include one or more firmware volumes, each volume having one or more firmware files used by the BIOS' firmware interface to initialize and test components of IHS 100. BMC 128 may include an integrated Dell Remote Access Controller (iDRAC) and may communicate with a remote client, such as a server or other remote information handling system, to receive firmware updates for information handling system components, such as PCI components 220.

In some cases, IHS 100 may be configured to access different types of computer-accessible media separate from memory 112. Generally speaking, a computer-accessible medium may include any tangible, non-transitory storage media or memory media such as electronic, magnetic, or optical media—e.g., magnetic disk, a hard drive, a CD/DVD-ROM, a Flash memory, etc. coupled to IHS 100 via northbridge controller 104 and/or southbridge controller 116.

In some implementations, northbridge controller 104 may be combined with southbridge controller 116, and/or be at least partially incorporated into CPU(s) 102. In other implementations, one or more of the devices or components shown in FIG. 1 may be absent, or one or more other components may be added. Accordingly, systems and methods described herein may be implemented or executed with other computer system configurations. In some cases, various elements shown in FIG. 1 may be mounted on a motherboard and protected by a chassis or the like.

Figure 2:
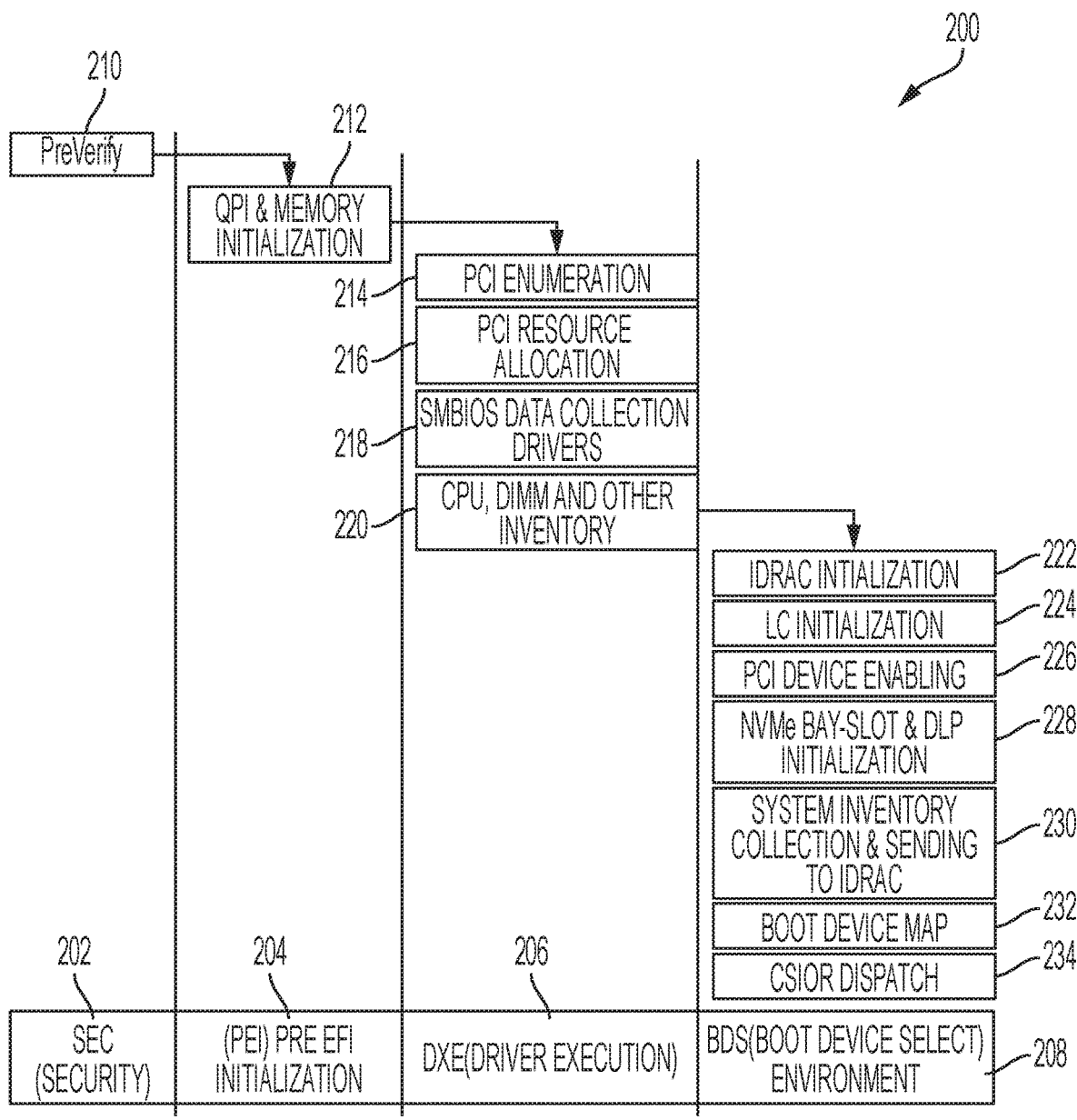
FIG. 2 is a process diagram of example information handling system detailed boot operation according to some embodiments of the disclosure.

When an information handling system is powered up, for example during a rebooting process, the information handling system may begin a booting process wherein a BIOS/UEFI may initialize and configure hardware and firmware, prepare the information handling system for booting of the operating system, and boot the operating system. An example process diagram 200 of a detailed booting process for an information handling system is shown in FIG. 2. The detailed booting process may allow for a full inventory of hardware and firmware, including installation of hardware and firmware updates that may have been downloaded following a prior booting process. After an IHS is powered on, the IHS may enter a security phase 202 where the BIOS/UEFI may perform a pre-verify operation 210 to examine the security certificate and verify that the device is ready for secure operation.

After the security phase 202, the IHS may enter a pre-extensible firmware interface initialization phase 204, wherein the IHS may perform Quick Path Interconnect (QPI) and memory initialization 212. After the Quick Path Interconnect and memory are initialized, the IHS may enter a driver execution phase 206.

During the driver execution phase 206, the information handling system may perform Peripheral Component Interconnect (PCI) enumeration 214 to detect, configure, and/or initialize any devices connected to and/or integrated in the information handling system. After performing PCI enumeration 214, the IHS may perform PCI resource allocation 216 to allocate resources, such as memory, to the detected devices. The IHS may then execute 218 system management basic input/output system (SMBIOS) data collection drivers before inventorying 220 the CPU, dual in-line memory modules (DIMMs), and/or other system elements. After the IHS has completed the driver execution phase 206, the IHS may proceed to a boot device select (BDS) environment phase 208 for selection of a boot device.

The IHS may perform integrated remote access controller initialization 222, such as initialization of a BMC. One example of a BMC may include an integrated Dell Remote Access Controller (iDRAC). The IHS may then perform line card (LC) initialization 224 and may enable PCI devices 226. The IHS may then perform non-volatile memory express (NVMe) bay-slot and data loss prevention (DLP) initialization 228. The IHS may then collect system inventory and send the system inventory to the integrated remote access controller 230. The IHS may map the boot device 232 and may perform a dispatch 234 of collected system inventory on restart (CSIOR). The information handling system may boot the operating system from the mapped boot device.

Figure 3:
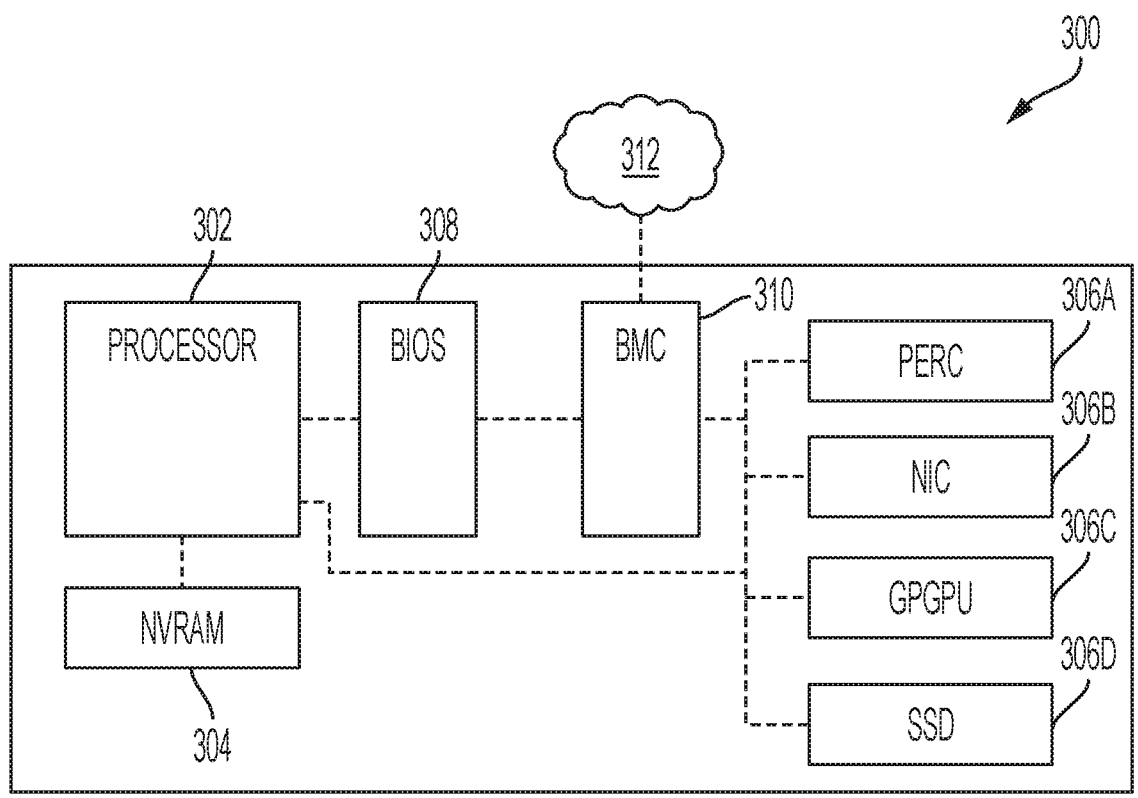
FIG. 3 is a block diagram of an example information handling system including a BIOS and a BMC according to some embodiments of the disclosure.

A baseboard management controller (BMC) of an information handling system may generate a signal for reloading a kernel of an operating system of an information handling system. Reloading the operating system kernel may, for example, allow an information handling system to recover from operating system errors without requiring a time-consuming detailed reboot of the information handling system. An example information handling system 300 is shown in FIG. 3. An information handling system 300 may include a processor 302 and an NVRAM 304. An information handling system 300 may also include a variety of PCI devices 306A-D, such as a PowerEdge Redundant Array of Independent Disks (RAID) Controller (PERC) 306A, a network interface controller (NIC) 306B, a general-purpose graphics processing unit (GPGPU) 306C, and a solid state drive (SSD) 306D.

An information handling system 300 may also include a BIOS 308 and a BMC 310. The BIOS 308 may perform tasks such as booting the information handling system 300. The BMC 310 may include firmware libraries for system components, and may, in some embodiments, include an iDRAC. The BMC 310 may connect to remote clients, such as remote servers or other remote information handling systems, through a network 312, such as the internet. For example, a remote client may connect to and manage the information handling system 300 through BMC 310. In some embodiments, a remote client may connect to and manage the information handling system 300 through an iDRAC of the BMC 310. A BMC 310 may also receive firmware updates via network 312 for components of the information handling system 300.

The BMC 310 may be configured to detect errors of an operating system of the information handling system 310. For example the BMC 310 may detect when an operating system of the information handling system becomes unresponsive, such as when encountering an operating system hang. The BMC 310 may be configured to generate a signal, detectable by an ACPI driver of the information handling system, indicating that the ACPI driver should reload the kernel of the operating system in order to resolve the operating system error. For example, the BMC 310 may generate a signal detectable by an ACPI driver of the BIOS 308 that the kernel of the operating system should be reloaded. A complex programmable logic device (CPLD) of the BMC 310 may be configured to generate the signal, detectable by the ACPI driver, for reloading the kernel of the operating system. The BMC 310 may generate a pulse on a power button line of the information handling system that is detectable by the ACPI driver, when the BMC 310 detects an operating system error, such as an operating system hang. The BMC 310 may be configured to generate the pulse for a predetermined amount of time and/or at predetermined intervals, which the ACPI driver may be configured to distinguish from a power down or reboot instruction by a user and to recognize as an instruction to reload a kernel of the operating system. For example, the BMC 310 may be configured to pulse the power button line twice at for 500 milliseconds, with an interval of 100 milliseconds between the two pulses. When the ACPI driver detects the signal, it may be configured to reload the kernel of the operating system from a memory of the information handling system 300, such as from an NVRAM 304.

In some embodiments, a remote client, such as an information handling system configured to manage information handling system 300, connected to the BMC 310 through network 312 may detect that the operating system is unresponsive, and may generate a signal to inform BMC 310 that the operating system of information handling system 300 has encountered an error. Upon detecting the signal from the remote information handling system, the BMC 310 may generate a signal for reloading the operating system kernel. In some embodiments, a user of the remote information handling system may detect that the operating system of the information handling system is unresponsive and may issue an instruction to the remote operating system, to be conveyed to the BMC 310, to reload the operating system kernel. Thus, a BMC 310 of an information handling system may be configured to initiate a kernel reload process in order to recover from operating system errors.

Figure 4:
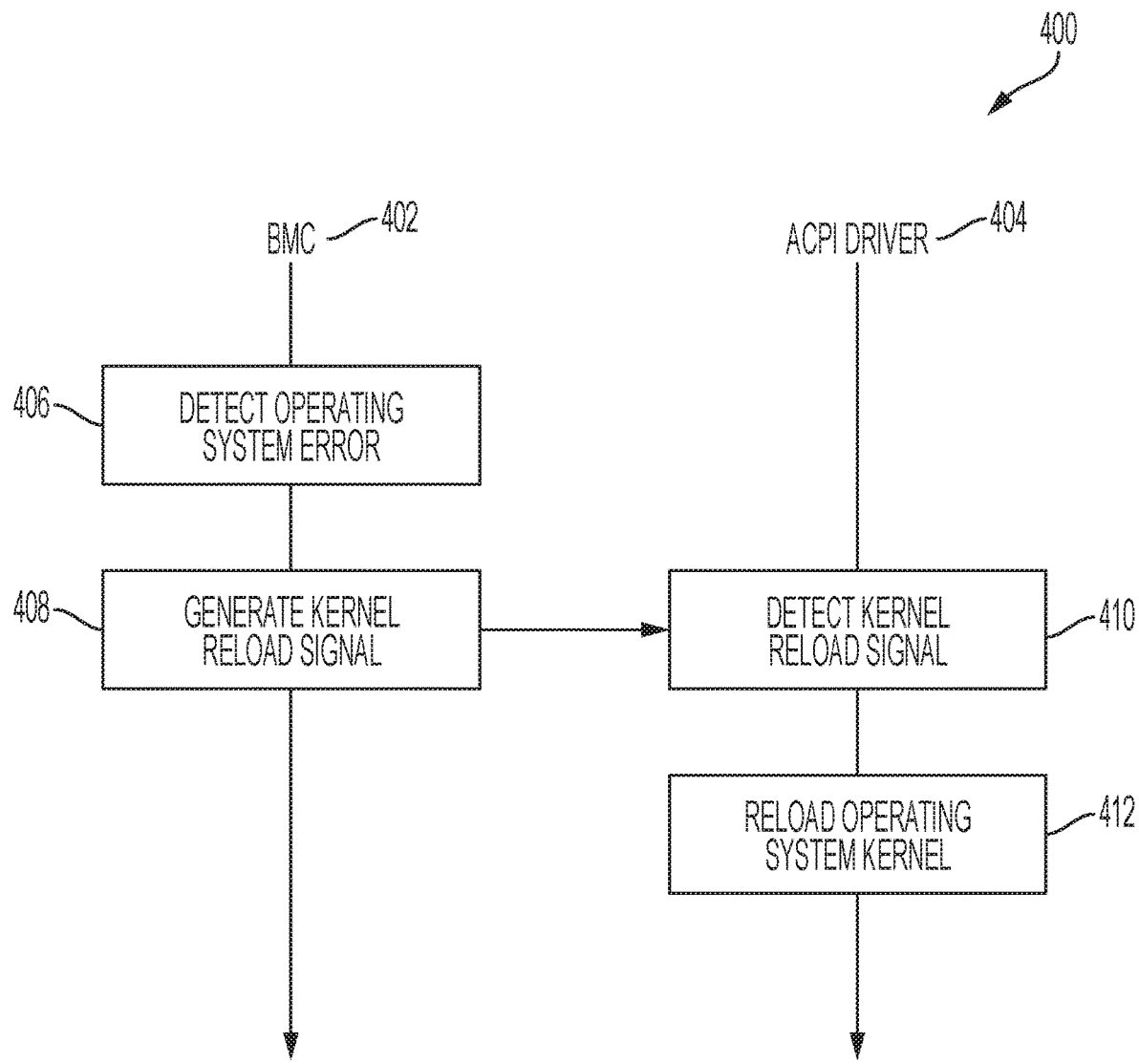
FIG. 4 is a is a process flow diagram of an example process for reloading a kernel of an information handling system upon detection of an operating system error, according to some embodiments of the disclosure.

A BMC may initiate reloading of a kernel of an operating system of an information handling system when an operating system error is detected. FIG. 4 shows a process flow diagram of a method 400 for reloading a kernel of an information handling system operating system in response to detection of an operating system error. A BMC 402 may communicate with an ACPI driver 404 of the information handling system to reload the operating system kernel when an operating system error is detected. The method 400 may begin, at step 406, with detecting an operating system error. The operating system error may, for example, include an unresponsive state, such as a hang of the operating system. For example, in some embodiments, a BMC 402 of an information handling system may detect an error of the operating system directly. In other embodiments, a remote client, such as a managing information handling system coupled to the information handling system through the BMC 402, may detect that an operating system has encountered an error and/or is unresponsive. The remote client may then signal to the BMC 402 that the operating system has encountered an error. For example, the remote client may connect to the information handling system through an iDRAC of the BMC 402. A user of the remote client may detect that the operating system of the information handling system is unresponsive and may instruct the BMC 402, through an iDRAC access program executed on the remote client to initiate a kernel reload. In some embodiments, the BMC or the remote client may detect an operating system error, such as a hang of the operating system, by determining that the operating system has failed to answer a query from the remote client or the BMC in a certain amount of time.

After the BMC has detected the operating system error, the BMC 402 may, at step 404, generate a signal to reload a kernel of the information handling system. In some embodiments, the BMC 402 may wait for a predetermined period of time before generating the signal to reload the kernel to determine whether the operating system error is a persistent error or a transient error. For example, the BMC 402 may detect that an operating system is unresponsive and initiate a timer. If the operating system becomes responsive again before a predetermined period of time has passed, the BMC 402 may refrain from generating the signal to reload the kernel.

In some embodiments, the BMC 402 may generate a signal, detectable by an ACPI driver 404 of the information handling system, instructing the ACPI driver 404 to reload the kernel of the information handling system. The ACPI driver 404 may, for example, be an ACPI driver 404 of a BIOS of the information handling system. A CPLD of the BMC 402 may generate a pulse on a power button line of the information handling system. The pulse may be detectable by the ACPI driver 404. For example, the BMC 402 may be configured to generate the pulse for a predetermined amount of time and/or at predetermined intervals, which the ACPI driver 404 may be configured to distinguish from a power down or reboot instruction by a user and to recognize as an instruction to reload a kernel of the operating system. For example, the BMC 402 may be configured to pulse the power button line for two intervals of 500 milliseconds, with an interval of 100 milliseconds between the two pulses.

At step 410, the ACPI driver 404 may detect the kernel reload signal. For example, the ACPI driver 404 may be configured to monitor the power button line of the information handling system to determine when a reboot, shut down, or kernel reset is requested.

After detecting the kernel reload signal, the ACPI driver 404 may, at step 412 reload the kernel of the operating system. For example, the ACPI driver 404 may issue a kernel reset command using kexec, a kernel execution mechanism. The kernel execution mechanism may reload the kernel without rebooting the information handling system and engaging in BIOS booting steps, as described with respect to FIG. 2, and without triggering an ACPI register reset. The kernel may, for example, be reloaded from an NVRAM of the information handling system. For example, a last known good state of the kernel may be reloaded from the NVRAM of the information handling system. In some embodiments, the information handling system may be configured to perform a detailed reboot if reloading the kernel does not resolve the operating system errors. Thus, a BMC 402 may issue a command to initiate a kernel reset when an operating system of an information handling system encounters one or more errors.

A kernel of an operating system of an information handling system may be reloaded upon detection of an operating system error. A method 500, for reloading a kernel of an information handling system, shown in FIG. 5, may begin, at step 502, with querying an operating system. For example, a BMC may query an operating system. In some embodiments, an iDRAC of the BMC may query the operating system or a remote client may query the operating system through the iDRAC. At step 504, the information handling system may determine if the operating system has responded within a predetermined time period. For example, the BMC may wait a predetermined time period for a response to the query made to the operating system If the BMC receives a response from the operating system within the predetermined period of time, it may continue normal operation. However, if the predetermined period of time passes without having received a response from the operating system, the BMC may determine that the operating system has encountered an error. For example, the operating system may have encountered an operating system hang, rendering the operating system unresponsive.

If an operating system error is detected, the information handling system may, at step 506, generate a signal to initiate a kernel reload. In some embodiments, a BMC of the information handling system may generate a signal to reload the operating system kernel. For example, a BMC may pulse power to a power button line of the information handling system to indicate that the operating system kernel should be reloaded. In some embodiments, a CPLD of the BMC may pulse power to generate the signal that the kernel should be reloaded.

At step 508, the information handling system may reload the kernel. For example, an ACPI driver of the information handling system may detect the signal generated by the BMC, such as a pulse on the power button line, and issue a kernel reset command in response to detecting the signal. In some embodiments, reloading the kernel may include reloading the kernel from an NVRAM of the information handling system.

Figure 5:
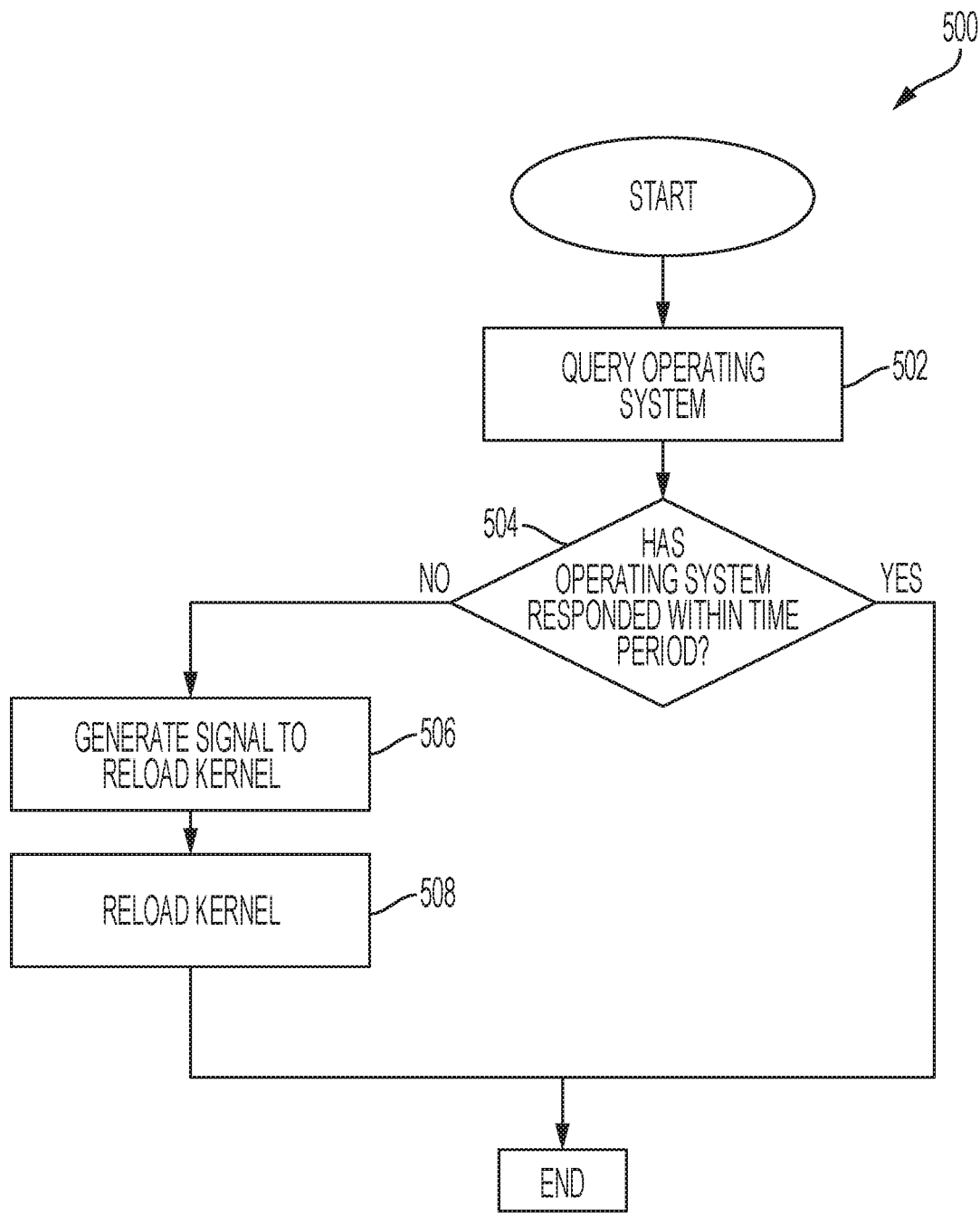
FIG. 5 is a block diagram of an example method for reloading a kernel of an information handling system upon detection of an operating system error, according to some embodiments of the disclosure.

The process flow diagram of FIG. 4 and the flow chart diagram of FIG. 5 are generally set forth as logical flow diagrams. As such, the depicted order and labeled steps are indicative of aspects of the disclosed method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagram, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

If implemented in firmware and/or software, functions described above may be stored as one or more instructions or code on a computer-readable medium. Examples include non-transitory computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise random access memory (RAM), read-only memory (ROM), electrically-erasable programmable read-only memory (EEPROM), compact disc read-only memory (CD-ROM) or other optical disk storage, magnetic disk storage or other magnetic storage devices, or any other medium that can be used to store desired program code in the form of instructions or data structures and that can be accessed by a computer. Disk and disc includes compact discs (CD), laser discs, optical discs, digital versatile discs (DVD), floppy disks and Blu-ray discs. Generally, disks reproduce data magnetically, and discs reproduce data optically. Combinations of the above should also be included within the scope of computer-readable media.

In addition to storage on computer readable medium, instructions and/or data may be provided as signals on transmission media included in a communication apparatus. For example, a communication apparatus may include a transceiver having signals indicative of instructions and data. The instructions and data are configured to cause one or more processors to implement the functions outlined in the claims.

Although the present disclosure and certain representative advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the present disclosure, processes, machines, manufacture, compositions of matter, means, methods, or steps, presently existing or later to be developed that perform substantially the same function or achieve substantially the same result as the corresponding embodiments described herein may be utilized. Accordingly, the appended claims are intended to include within their scope such processes, machines, manufacture, compositions of matter, means, methods, or steps.

What is claimed is:

1. A method for reloading a kernel of an operating system of an information handling system, comprising:
    generating a signal, by a baseboard management controller (BMC), for reloading the kernel of the operating system; and
    reloading the kernel of the operating system based on the signal generated by the BMC,
    wherein reloading the kernel comprises issuing a kernel reset command by an advanced configuration and power interface (ACPI) driver of the information handling system, and
    wherein reloading the kernel comprises resetting the kernel without rebooting the information handling system.

2. The method of claim 1, further comprising:
    detecting an operating system hang,
    wherein the step of generating is performed based, at least in part, on the detection of the operating system hang.

3. The method of claim 1, wherein generating the signal comprises pulsing power to a power button line of the information handling system for a predetermined interval.

4. The method of claim 3, wherein pulsing power to the power button line of the information handling system is performed by a complex programmable logic device (CPLD) of the BMC.

5. The method of claim 1, further comprising detecting the signal, by the advanced configuration and power interface (ACPI) driver of the information handling system.

6. The method of claim 1, wherein reloading the kernel comprises reloading the kernel from a non-volatile random access memory (NVRAM) of the information handling system.

7. The method of claim 1, wherein resetting the kernel without rebooting the information handling system comprises reloading the kernel without engaging in basic input output system (BIOS) booting steps.

8. An information handling system comprising:
a baseboard management controller (BMC); and
a processor,
wherein the processor is configured to perform steps comprising
detecting a signal generated by the BMC for reloading a kernel of the operating system; and
reloading the kernel of the operating system based on the signal generated by the BMC,
wherein reloading the kernel comprises issuing a kernel reset command by an advanced configuration and power interface (ACPI) driver of the information handling system, and
wherein reloading the kernel comprises resetting the kernel without rebooting the information handling system.

9. The information handling system of claim 8, wherein the BMC is configured to perform steps comprising:
detecting an operating system hang, and
generating the signal for reloading the kernel of the operating system based, at least in part, on the detection of the operating system hang.

10. The information handling system of claim 8, wherein the BMC is configured to generate the signal by pulsing power to a power button line of the information handling system for a predetermined interval.

11. The information handling system of claim 10, wherein pulsing power to the power button line of the information handling system is performed by a complex programmable logic device (CPLD) of the BMC.

12. The information handling system of claim 8, further comprising detecting the signal, by the advanced configuration and power interface (ACPI) driver of the information handling system.

13. The information handling system of claim 8, wherein reloading the kernel comprises reloading the kernel from a non-volatile random access memory (NVRAM) of the information handling system.

14. The information handling system of claim 8, wherein resetting the kernel without rebooting the information handling system comprises reloading the kernel without engaging in basic input output system (BIOS) booting steps.

15. A computer program product, comprising:
a non-transitory computer readable medium comprising instructions to perform steps comprising:
generating a signal, by a baseboard management controller (BMC), for reloading a kernel of an operating system; and
reloading the kernel of the operating system based on the signal generated by the BMC,
wherein reloading the kernel comprises issuing a kernel reset command by an advanced configuration and power interface (ACPI) driver of an information handling system, and
wherein reloading the kernel comprises resetting the kernel without rebooting the information handling system.

16. The computer program product of claim 15, wherein the non-transitory computer readable medium comprises instructions to perform steps further comprising:
detecting an operating system hang,
wherein the step of generating is performed based, at least in part, on the detection of the operating system hang.

17. The computer program product of claim 15, wherein generating the signal comprises pulsing power to a power button line of the information handling system for a predetermined interval.

18. The computer program product of claim 17, wherein pulsing power to the power button line of the information handling system is performed by a complex programmable logic device (CPLD) of the BMC.

19. The computer program product of claim 15, wherein the non-transitory computer readable medium comprises instructions to perform steps further comprising detecting the signal, by the advanced configuration and power interface (ACPI) driver of the information handling system.

20. The computer program product of claim 15, wherein resetting the kernel without rebooting the information handling system comprises reloading the kernel without engaging in basic input output system (BIOS) booting steps.

* * * * *